(12) United States Patent
Baum et al.

(10) Patent No.: US 10,108,437 B2
(45) Date of Patent: Oct. 23, 2018

(54) RENDITION OF A CONTENT EDITOR

(75) Inventors: Geoffrey King Baum, Palo Alto, CA (US); Lalit Balchandani, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 2803 days.

(21) Appl. No.: 11/706,039

(22) Filed: Feb. 12, 2007

(65) Prior Publication Data
US 2008/0195949 A1 Aug. 14, 2008

(51) Int. Cl.
*G06F 9/445* (2018.01)
*G11B 27/034* (2006.01)
*G11B 27/34* (2006.01)
*H04N 5/44* (2011.01)
*H04L 27/32* (2006.01)

(52) U.S. Cl.
CPC ........ *G06F 9/44505* (2013.01); *G11B 27/034* (2013.01); *G11B 27/34* (2013.01); *H04L 27/32* (2013.01); *H04N 5/44* (2013.01)

(58) Field of Classification Search
CPC .............................. G06F 21/31; G06F 3/0481
USPC .................................................. 715/765, 741
See application file for complete search history.

(56) References Cited

U.S. PATENT DOCUMENTS

| | | | | | |
|---|---|---|---|---|---|
| 5,659,793 | A | * | 8/1997 | Escobar | ............ G06F 17/30017 345/629 |
| 5,675,752 | A | * | 10/1997 | Scott | ......................... G06F 8/38 715/202 |
| 6,725,238 | B1 | * | 4/2004 | Auvenshine | |
| 6,750,885 | B1 | * | 6/2004 | Finch, II | .............. G06Q 10/109 715/776 |
| 6,956,574 | B1 | | 10/2005 | Cailloux et al. | |
| 7,093,198 | B1 | * | 8/2006 | Paatero | ................. G06F 9/4443 715/746 |
| 7,190,369 | B2 | * | 3/2007 | Fernandez et al. | ........... 345/581 |
| 7,197,715 | B1 | * | 3/2007 | Valeria | .......................... 715/747 |
| 7,278,109 | B2 | * | 10/2007 | Shalabi et al. | ................. 715/762 |
| 7,426,691 | B2 | * | 9/2008 | Novak et al. | .................. 715/744 |
| 7,500,198 | B2 | * | 3/2009 | Mathews et al. | ............. 715/744 |

(Continued)

OTHER PUBLICATIONS

International Searching Authority, International Search Report, dated Jul. 22, 2008, p. 1.

*Primary Examiner* — Doon Chow
*Assistant Examiner* — Le Nguyen
(74) *Attorney, Agent, or Firm* — Kilpatrick Townsend & Stockton LLP (57) ABSTRACT

Example embodiments herein include a process executing in a browser that obtains a video editor application over a network. After obtaining the video editor application, a configuration process associated with the video editor application obtains a configuration file over the network. The configuration file identifies operable characteristics of the video editor application to be enabled for use by a corresponding user viewing the browser. The configuration process associated with the video editor application running on the browser executes the instance of the video editor application in accordance with the configuration file obtained over the network. Creation, maintenance, and distribution of different configuration files for different contexts enables the same video editor application running on corresponding remote browsers to be selectively configured in one of many different ways.

12 Claims, 9 Drawing Sheets

(56) References Cited

U.S. PATENT DOCUMENTS

| | | | |
|---|---|---|---|
| 8,234,174 B1* | 7/2012 | Eagon | G06Q 10/087 705/14.4 |
| 8,683,333 B2* | 3/2014 | Garbow | G06Q 30/02 715/706 |
| 2001/0036356 A1 | 11/2001 | Weaver et al. | |
| 2002/0019851 A1* | 2/2002 | Pollack | 709/206 |
| 2002/0036654 A1* | 3/2002 | Evans | G06F 17/243 715/744 |
| 2002/0161603 A1* | 10/2002 | Gonzales | G06Q 10/10 709/205 |
| 2002/0194195 A1* | 12/2002 | Fenton | G06F 17/30038 |
| 2003/0046578 A1* | 3/2003 | Brown | G06F 21/10 726/6 |
| 2003/0237046 A1* | 12/2003 | Parker | G06F 17/24 715/234 |
| 2004/0091243 A1 | 5/2004 | Theriault et al. | |
| 2004/0095382 A1* | 5/2004 | Fisher et al. | 345/744 |
| 2004/0130574 A1* | 7/2004 | Kautto-Koivula et al. | 345/764 |
| 2004/0221225 A1 | 11/2004 | Hyman et al. | |
| 2004/0225658 A1* | 11/2004 | Horber | G06F 17/211 |
| 2004/0233209 A1* | 11/2004 | Evans et al. | 345/581 |
| 2006/0253781 A1* | 11/2006 | Pea et al. | 715/723 |
| 2007/0028304 A1* | 2/2007 | Brennan | 726/24 |
| 2007/0156670 A1* | 7/2007 | Lim | 707/4 |
| 2008/0034420 A1* | 2/2008 | Chang | 726/15 |
| 2008/0183573 A1* | 7/2008 | Muschetto | G06Q 30/02 705/14.41 |

* cited by examiner

FIG. 1

```
<!-- example script enumerating configurable features 195 and fields 196 of video editor application 153 -->
<application config>
  <!-- Ad Configuration -->
  <adunit height="92" refresh="30">
    <ad path="assets/ads/ad.jpg" href="http://www.adobe.com/" />
    <ad path="assets/ads/bep.jpg"
        href="http://www.adobe.com/photos/" />
  </adunit>
  <style source="style/ExpressStyle.swf" backgroundGradientColors="0x7b8493,0x4d596c"
         backgroundGradientAlphas="1,1" backgroundAlpha="1"
         backgroundImage="assets/backgrounds/backgrnd.jpg">
  </style>
  <!-- Media Bin Configuration -->
  <bins >
    <bin title="My Videos" path="config/videos.xml" >
      <style> <header styleName="binIconVideo" /> </style>
    </bin>
    <bin title="My Images"> ... </bin>
    <bin title="My Graphics"> ... </bin>
    <bin title="My Effects"> ... </bin>
    <bin title="My Music" path="config/mediabins/music.xml" type="tile">
      <columns>
        <preview dataField="path" headerText="" width="20"/>
        <column dataField="Art" headerText="Art" width="10"/>
        <column dataField="title" headerText="Trk" width="10"/>
        <column dataField="albm" headerText="Albm" width="10"/>
      </columns>
    </bin>
  </bins>
</application config>
```

RENDITION OF A CONTENT EDITOR

BACKGROUND

Conventional video editing software applications enable users to edit, manage and create various types of video media content for personal and/or professional purposes. Based on use of such applications, digital videos, images and sounds may be modified and combined in conventional video editing software to produce a desired multi-media effect.

Typically, a user can access various types of digital content on a local computer using a corresponding graphical user interface (e.g., including menus, icons, toolbar functions, etc.) associated with an executed video editing software application. In such a context, as mentioned above, the video editing software typically enables users to add graphics (e.g., superimpose captions, titles, etc.) and effects to the edited video media content. Such effects may include features such as a black and white mode, blurring of images and video frames, transition schemes for transitioning between video clips, and/or similar methods suitable for producing creative digital video content.

SUMMARY

Conventional video editor applications suffer from a variety of deficiencies. In particular, conventional video editing software is inflexible and lacks scalability for dynamically creating corresponding customized "look and feel" for specific purposes or contexts (e.g., advertising campaigns, contests, etc.). For example, the process of individually modifying video editing software to accommodate different appearances and/or functionality for use in different contexts can require painstaking effort. Currently, there exists no method for efficiently creating and/or modifying the appearance and features associated with video editor applications so that such applications have an associated look and feel that has been customized for different types of users or contexts.

Embodiments disclosed herein can significantly overcome such deficiencies and/or other deficiencies in the prior art. For example, embodiments herein include a method for maintaining a set of configurable attributes, functions, features, etc. in one or more configuration files to enable customization of the look, feel and functionality associated with a editing software application for various digital media (e.g., audio, video, etc.). Populating one or more configuration files with different configuration information according to embodiments herein enhances scalability since each of multiple configuration files can define a different set of features, functions, etc. for enabling an editor application (e.g., video editor application) and how the editor application will appear or be presented to a given type of user.

In particular, according to such embodiments, a programmer or website administrator can create one or more reconfigurable templates (e.g., for producing different configuration files) for use in various implementations of the video editing software. For example, a configuration file according to embodiments herein can include information supporting a sponsor's advertising campaign that is being implemented to promote an effort such as promotion use of a website.

A configuration file according to embodiments herein can be created using an eXtensible markup language (XML) format or other language.

A server can be employed to initiate distribution of one or more configuration files (e.g., XML or other types of files) over a network to different browser applications enabling use of a graphical user interface associated with a video editor application. To provide a specific "look and feel" associated with video editing software application running on a browser, the browser employs use of a retrieved configuration file to dynamically configure or enable different features of the locally operated video editor application. As previously discussed, the configuration files can include different setting information for configuring the same video editor application for use by users in different specific contexts. Thus, use and dissemination of configuration files according to embodiments herein provides scalability and portability in a network environment.

In various embodiments as described herein, the configuration file contains information identifying features such as the different types of media content that can be accessed by the video editor application, the background appearance of the video editing graphical user interface on the browser, and/or other characteristics associated with the "look and feel" of a video editor application. It should be noted that that embodiments disclosed herein can also be used in conjunction with standard desktop video editing applications.

In accordance with embodiments disclosed herein, a configuration process can enumerate (e.g., specify) different features that will be enabled for a respective video editor application. The settings specified in the configuration file define (among other things) a behavior of the video editor application and thus impact the operation of the video editor application upon execution. As discussed above, the configuration information can be enumerated according to a predetermined syntax (e.g., a scripting language such as XML). As such, the configuration information encoded according to the predetermined syntax is operable to indicate different features such as access methods that will be enabled by a graphical user interface associated with the video editor application In other embodiments, a configuration process (e.g., running in a browser) can obtain a video editor application over a network such as the Internet. After obtaining the video editor application, the configuration process obtains a configuration file based on communications over the network. In one embodiment, the configuration process utilizes contents of the configuration file to identify features of the video editor application to be enabled for an instance of the video editor application executing in conjunction with the browser. For example, the configuration process can execute the instance of the video editor application in the browser and in accordance with the configuration file that was obtained over the network.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

As discussed above, techniques herein are well suited for use in distribution and configuration of a video editor application. However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
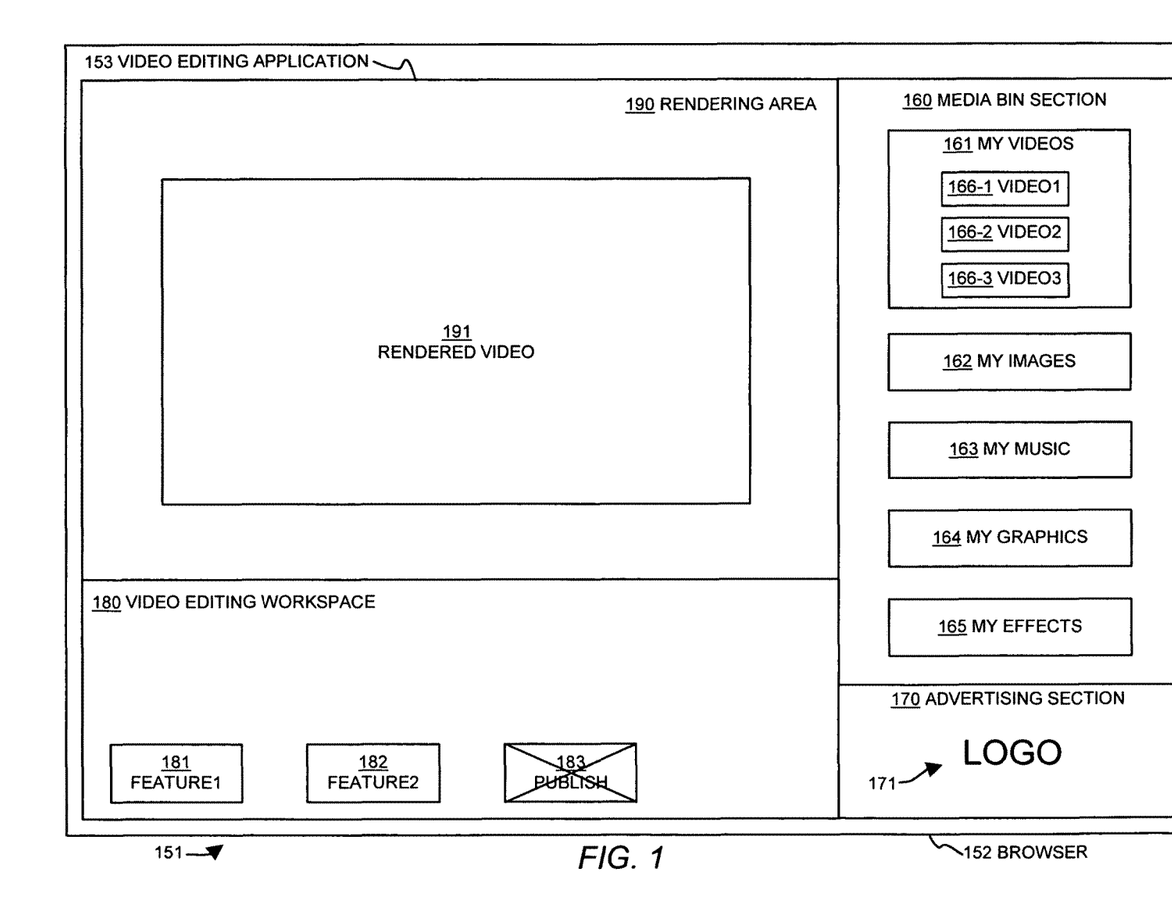
FIG. 1 is an example block diagram of a graphical user interface displaying a browser and corresponding video editor application in accordance with one example configuration according to embodiments herein.
Figure 3:
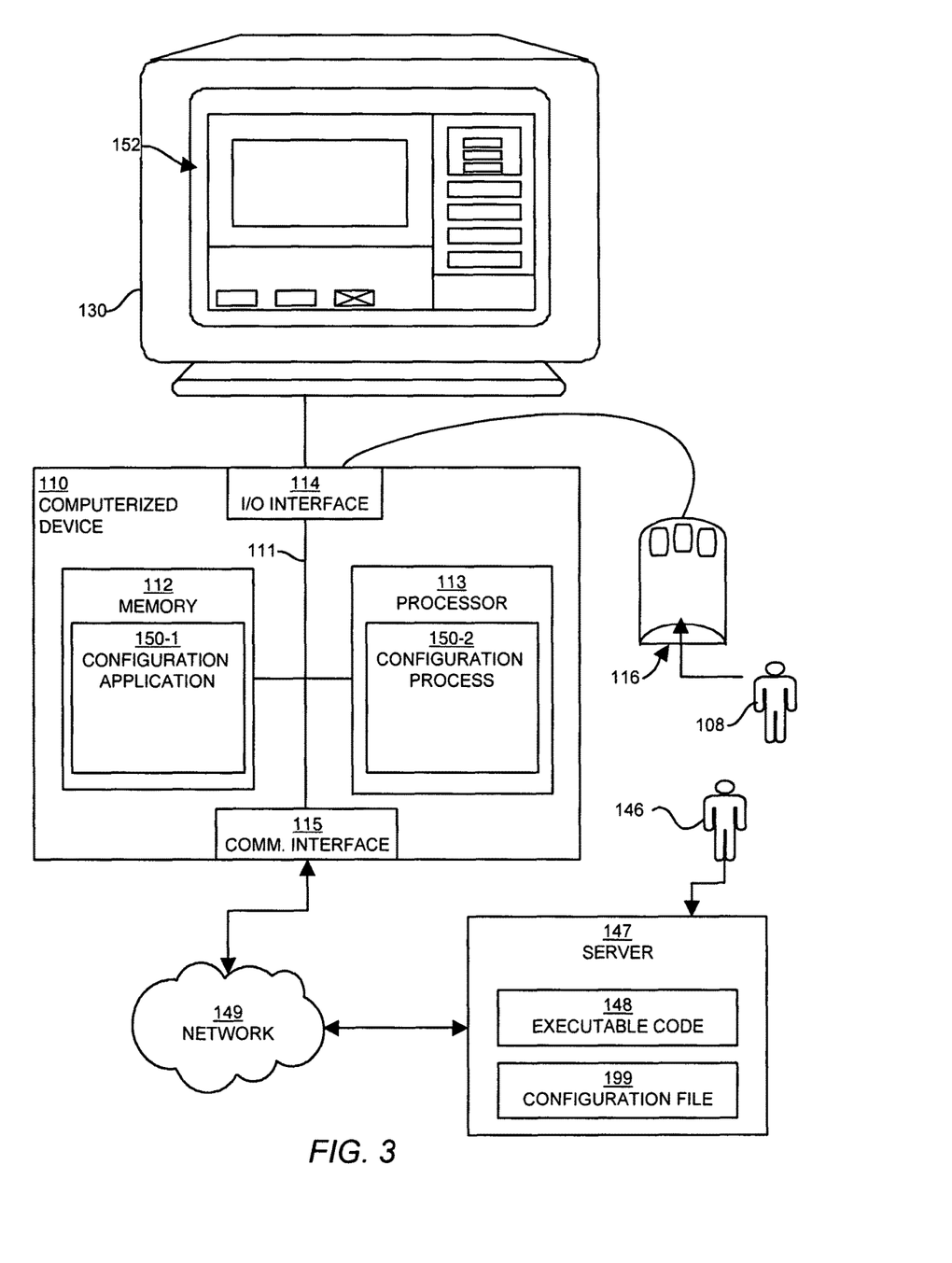
FIG. 3 is an example block diagram of a computerized system configured with an application including a configuration process in communication with a server across a network in accordance with one example configuration according to embodiments herein.

FIG. 1 is a block diagram illustrating an example embodiment of a video editing environment 151 including a browser 152 and video editor application 153. As shown in FIG. 3, the video editor application 153 can be presented on browser 152 in response to receiving executable code 148 (e.g., executable code associated with video editor application) from a remote server 147 over a network 149 (e.g., a publicly accessible network such as the Internet, wide area network, local area network, etc.). In addition to receiving the executable code 148 enabling local execution and use of video editor application 153 on a browser 152, the browser 152 can also obtain a corresponding configuration file 199 from the remote server 147. As will be discussed later in this specification, the received configuration file 199 can specify the look and feel associated with display and execution of the video editor application 153. It should be noted that the embodiments discussed herein may include editor application software pertaining to other types of digital media. As such, embodiments disclosed herein should not be limited to a video editing application and, thus, other types of media editing software can be implemented without departing from the scope and spirit of the invention.

Referring again to FIG. 1, the browser 152 may be any type of commonly used web browsing application (e.g., Internet Explorer™, etc.). The video editor application 153, when executed on the browser 152, can include different enabled features depending on the settings as specified by the corresponding retrieved configuration file 199. In other words, according to one embodiment, the browser 152 can initiate communications over a respective network to obtain and thereafter execute a corresponding video editor application. In turn, the video editor application 153 and/or other resource associated with browser 152 can initiate retrieval of an appropriate configuration file 199 to learn which features to enable for the user viewing browser 152.

As mentioned above, the video editor application 153, when executed on the browser 152, can include different enabled features depending on the settings as specified by the corresponding retrieved configuration file 199. For example, the video editor application 153 can include a display of a media bin section 160 containing various media bins 161-165 as specified by the retrieved configuration file 199. Upon selection by a respective user, contents associated with the media bin 160 can be viewed in rendering area 190. Accordingly, the different media bins (e.g., locally or remotely stored content) displayed in the display region associated with media bin section 160 dictate which other media can be selectively viewed for viewing in rendering area 190.

As shown in the example embodiment of FIG. 1, the video editor application 153 displays a My Videos media bin 161, a My Photos media bin 162, a My Music media bin 163, a Graphics media bin 164 and an Effects media bin 165. The My Videos media bin 161 is shown in an expanded format such that associated content (e.g., Video1 166-1, Video2 166-2 and Video3 166-3) are displayed in the My Videos media bin box. The remaining media bins 162-165 are shown in a collapsed format such that the associated content (e.g., images, pictures, audio clips, graphics, captions, effects, etc.) can be expanded based on input form a user. Of course, content in each of these bins can be selected and expanded by a respective user viewing browser 152.

Note that the media bins 161-165 shown in FIG. 1 depict only one example embodiment and, as such, the video editor application 153 may also include additional, fewer and/or different media bins having different labels and names. As will be discussed in more detail below, the media bins 161-165 may be enabled or disabled in accordance with policies (as specified by an accompanying configuration file 199) associated with the video editor application 153. As described herein, a server distributes different configuration files for different users so that the video editor application 153 can be specifically tailored for different types of users.

Still referring to FIG. 1, the video editor application 153 also includes an advertisement section 170 (e.g., advertising display region) dedicated to rendering of one or more advertising units 171 (e.g., advertisement information such as graphics, images, animation, audio clips, and the like) for various advertising campaigns or sponsors. Again, received configuration file 199 associated with video editor application 153 (directly or indirectly) specifies what to display in advertising section 170.

The example embodiment in FIG. 1 displays a generic "LOGO" image as a sample advertisement unit 171. As will be discussed in further detail below, the advertisement section 170 can be used to selectively present different types of advertisement information (e.g., advertising campaigns, sponsorships, etc.) over time. Accordingly, a user can be exposed to different advertisements during a single session of using video editor application 153.

In addition to the above-mentioned features, FIG. 1 depicts a video editing workspace 180 where a user 108 of the video editor application 153 can edit and create videos using various content selected from the media bins 161-165. The video editing workspace 180 can include different features 181-183 (e.g., publish, preview, etc.) that may also be enabled or disabled in accordance with policies (e.g., a configuration) specified by configuration file 199 video editor application. In other words, a generic video editor application 153 can be configured to support thirty different types of editing functions. A corresponding retrieved configuration file 199 at browser 152 can specify which order information of the thirty different types of editing functions to enable on the instance of video editor application 153 running on browser 153. Another browser running an instance of the generic video editor application code at a different website can enable a different set of features in accordance with another configuration file. Accordingly, different configuration files according to embodiments herein enable different functions of the video editor application.

As additionally shown in FIG. 1, the video editor application 153 further includes a rendering area 190 where a presented video 191 (edited and/or unedited) is displayed for viewing by a user of browser 152. It should be noted that the configuration of the various video editing sections, workspaces, media bins, features, etc., shown in FIG. 1 depict only one example embodiment and the methods and apparatus described herein should not be limited as such.

As mentioned above, the appearance and functionality of the video editor application 153 is configured by accompanying configuration file 199 to accommodate different use cases (e.g., marketing campaigns for different sponsors, contests, etc.). In an example embodiment, the configuration file 199 can be retrieved and read by the video editor application 153 (or browser 152) either while the video editor application 153 is loading in the user's 108 computer 110, or some time after the video application 153 has finished loading in the user's 108 computer 110. As an example, the user associated with browser 152 can visit a particular website enabling use of a video editor application. In response to visiting a respective website or request by the user to utilize the video editor application 153, a server can initiate transmission of a generic code to run the video editor application 153 on browser 152. In addition to receipt of the generic code at the browser 152, the browser 152 can receive a configuration file 199 depending on a context such as identity of the user, type of content being edited, input provided by the user, one or more websites visited by the user, history of web usage, etc.

Figure 2:
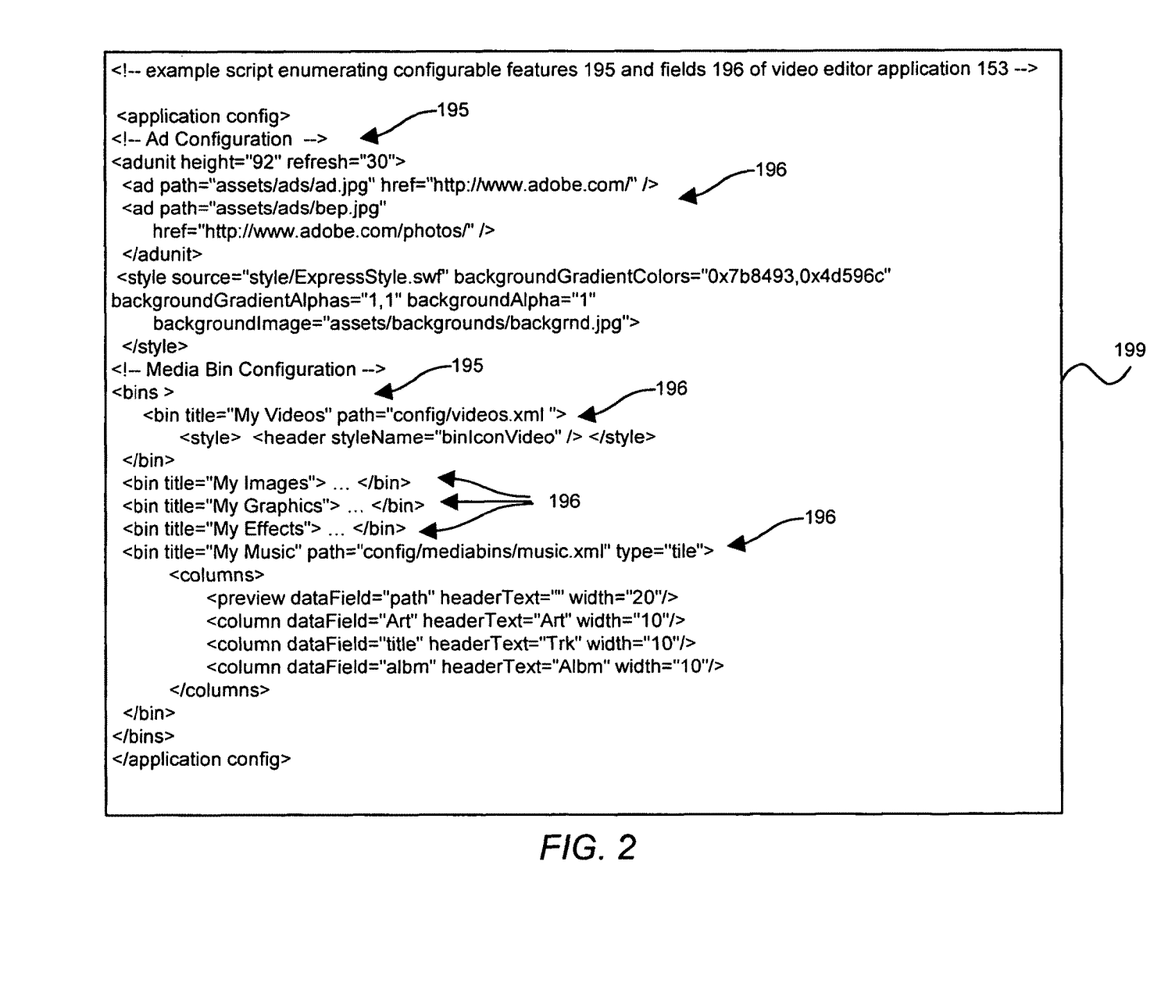
FIG. 2 depicts an example embodiment of a configuration file in a scripting language format for use in a video editing environment according to embodiments herein.

FIG. 2 shows an example embodiment of configuration file 199 in a scripting language format (e.g., XML code). In general, the configuration file 199 can be written in a scripting language format so that the video editor application 153 can dynamically read and interpret the various data contained in the configuration file 199. Referring to FIG. 2, the example script enumerates different settings 195 for the video editor application 153 in a collapsible form such that some of the fields 196 associated with each setting 195 are not shown (e.g., wherein an ellipsis " . . . " depicts the collapsed settings 195 and fields 196).

The settings 195 and fields 196 in FIG. 2 are designated with tags enclosed by '<' and '>' symbols. To exemplify a typical script format, the "adunit" setting, inter alia, is expanded such that the fields 196 associated with the "adunit" setting are shown in FIG. 2. More specifically, the "adunit" setting in FIG. 2 enumerates a refresh rate ("refresh") field and two "adpath" fields that specify uniform resource locators (URLs) where advertising content is located for retrieval and display in advertising section 170. It should be noted that a scripting language defining features associated with the video editor application 153 may include other settings 195 and fields 196, or fewer settings 195 and fields 196, and may have differing subordinate relationships (e.g., a different hierarchical structure) with respect to one another in order to provide a manner of access to the video editor application 153 such that a network administrator (e.g., network administrator 146 as shown in FIG. 3) can modify the configuration file 199 in accordance with the methods described herein.

FIG. 3 is a block diagram illustrating example architecture of a computer system 110 that executes, runs, interprets, operates or otherwise performs a configuration application 150-1 and configuration process 150-2. The computer system 110 may be any type of computerized device such as a personal computer, workstation, portable computing device, console, laptop, network terminal, client, etc. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands and generally control the browser 152 (e.g., the graphical user interface discussed above with respect to FIG. 1) that the configuration application 150-1 and configuration process 150-2 provides for display on display 130. The communications interface 115 enables the computer system 110 to communicate with other devices (e.g., other computers such as server 147) over a respective a network 149 (e.g., a local area network, the Internet, etc.).

The memory system 112 can generally be any type of computer readable medium and (in this example) is encoded with a configuration application 150-1. The configuration application 150-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the configuration application 150-1. Execution of configuration application 150-1 in this manner produces processing functionality in a configuration process 150-2. In other words, the configuration process 150-2 represents one or more portions of runtime instances of the configuration application 150-1 (or the entire application 150-1) performing or executing within or upon the processor 113 in the computerized device 110 at runtime.

It should be noted that the configuration process 150-2 can reside wholly, or in part, in the client browser 152, the client video editor application 153 and/or any network application executing or administering the associated video editor application 153 (e.g., a server-side application administering the video editor application 153 via a website).

FIGS. 4-9 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
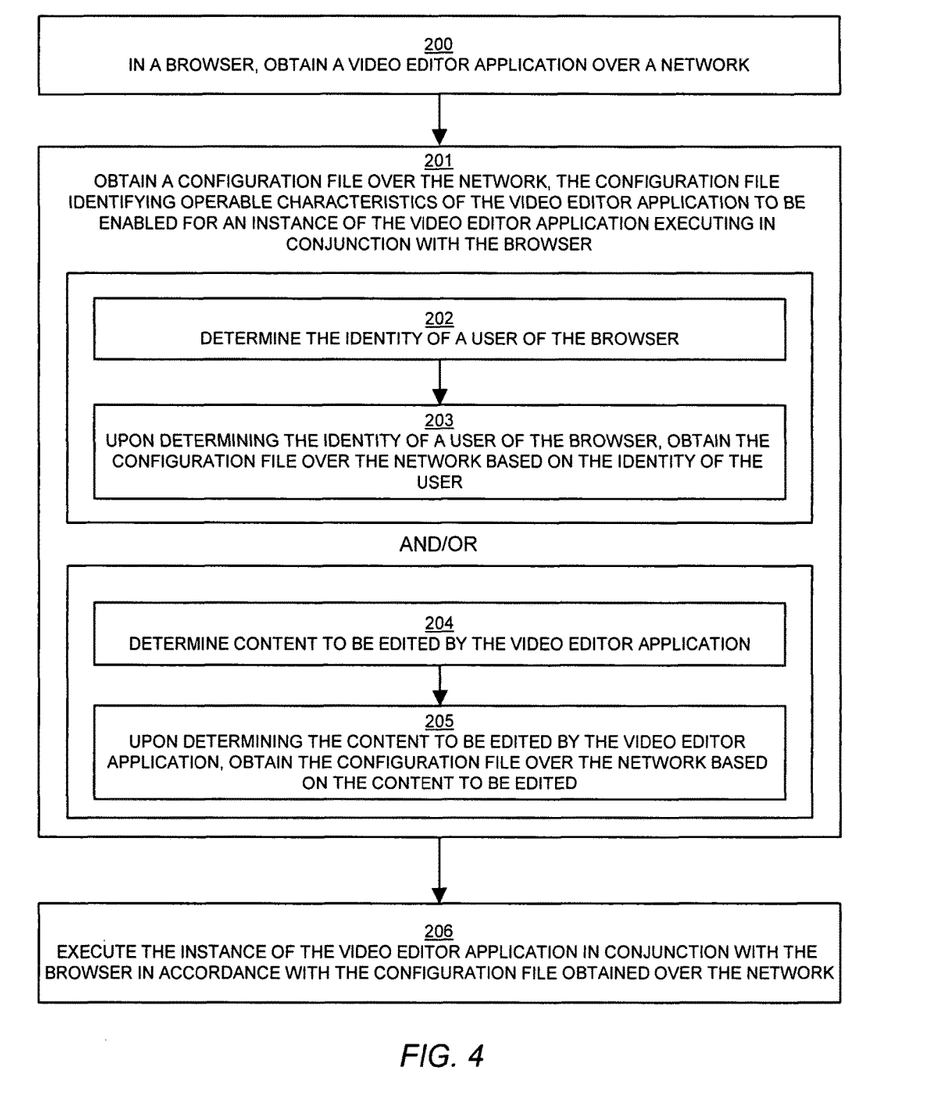
FIG. 4 is a flow chart of processing steps performed by a configuration process according to embodiments herein.

Now, more specifically, FIG. 4 is a flow chart of processing steps that shows processing operations performed by the configuration process 150-2 for obtaining and operating a video editor application 153 over a network 149 in accordance with one example embodiment.

In step 200, the configuration process 150-2 obtains, in browser 152, a video editor application 153 (e.g., via retrieval of executable code 148) over a network 149 (e.g., Local Area Network "LAN", Wide Area Network "WAN", a wireless, the Internet, and the like). In one embodiment the configuration process 150-2 obtains, via a browser 152 (e.g., Internet Explorer™), an executable file (e.g., executable code 148) over a network 149, wherein the executable file 148 contains code for initiating operation of the video editor application 153.

In step 201, the configuration process 150-2 obtains a configuration file 199 over the network 149 (e.g., LAN, Internet, etc.). As mentioned above, the configuration file 199 identifies operable characteristics of the video editor application 153 that are to be enabled for an instance of the video editor application 153 running on the browser 152. The configuration process 150-2 can obtain the configuration file 199 before, during, or after obtaining executable code 148 associated with the video editor application 153. As discussed above with respect to FIG. 2, the configuration file 199 identifies operable characteristics (e.g., settings 195 and fields 196) of the video editor application 153 such as, but not limited to, policies, advertising units, media bins, background themes, skins, etc.

In step 202, the configuration process 150-2 determines the identity of a user 108 (or a context of video editor application 153 use) associated with the browser 152. The identity of a user 108 may be determined by ascertaining unique identifier information specific to that user 108, the user's computer, context of use, etc. The unique identifier information may be any one of, but not limited to, a cookie, an Internet Protocol (IP) address, a computer name, a user identification (e.g., userID or user name) and/or a password, etc.

In step 203, upon determining the identity of a user of the browser 152, the configuration process 150-2 obtains the configuration file 199 over the network 149 based on the identity of the user. Therefore, a programmer/administrator of the configuration files can tailor various themes, feature sets, advertising campaigns, policies, media bins, etc. according to the identity of a user of the browser 152. For example, a specific configuration file 199 may be distributed by server 147 for use by a different classes of users (at browsers) based on parameters such as age, gender, interests, etc. in order to grant access to content and media enabled by the configuration file 199.

In step 204, the configuration process 150-2 determines content (e.g., video files, audio files, images, etc.) that potentially can be edited by the video editor application 153 when instantiated on browser 152. The configuration process 150-2 may determine which content can be edited while the video editor application 153 is loading in the browser, or at any time after the video editor application 153 has loaded in the browser.

In step 205, upon determining which content can be edited by the video editor application 153, the configuration process 150-2 obtains the configuration file 199 over the network 149 from server 147 based on the content to be edited. For example, if a user 108 of the video editor application 153 decides to edit certain types of content (e.g., video files), the configuration process 150-2 may retrieve a configuration file 199 that has policies tailored to the usage and accessibility of that particular type of content, format of content, etc.

In step 206, the configuration process 150-2 executes the instance of the video editor application 153 for display enabling usage on the browser 152 in accordance with the configuration file 199 obtained over the network 149. As per one example embodiment, the configuration process 150-2 executes an instance of the video editor application 153 in Internet Explorer™ in accordance with the appearance and functionality as determined by the configuration file 199. In another embodiment, the configuration process 150-2 (via browser 152) can dynamically obtain different configuration files during an editing session. For example, the configuration process 150-2 can initially configure the video editor application 153 for editing a first selected type of content and, thereafter, initiate retrieval and implementation of another configuration file for reconfiguring the video editor application 153 and editing of a second type of content.

Figure 5:
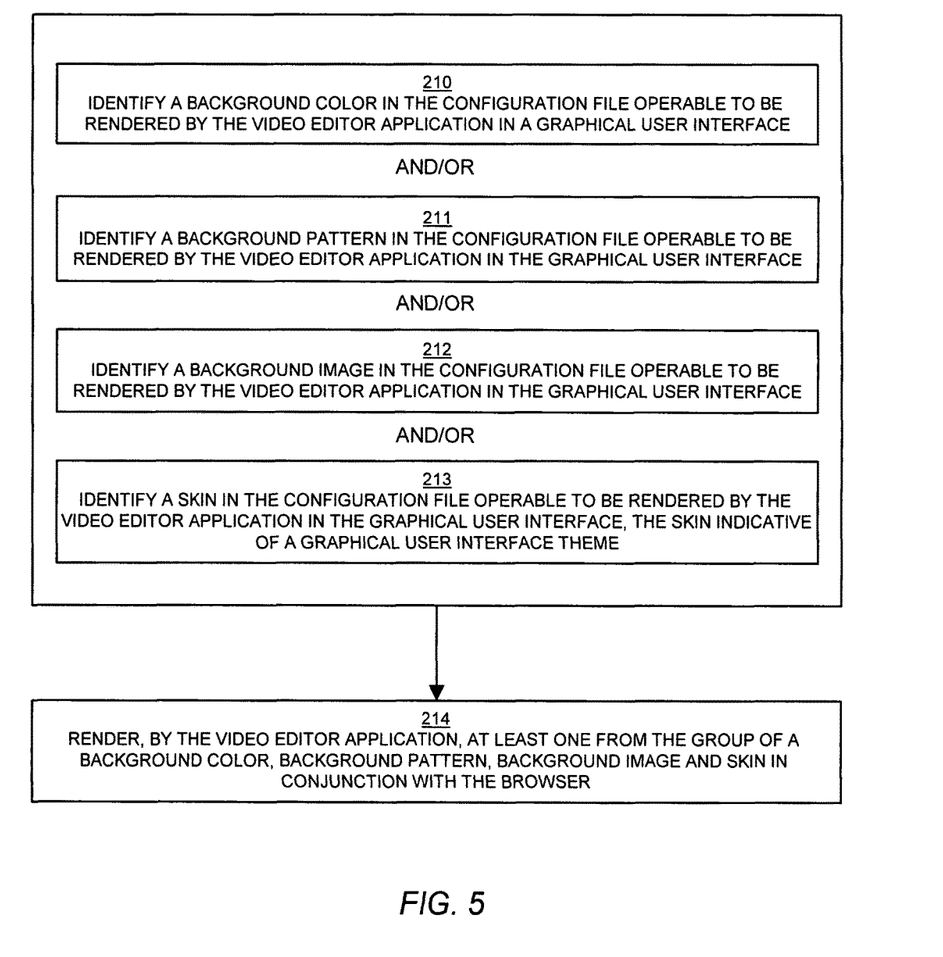
FIG. 5 is a flow chart of processing steps performed by a configuration process according to embodiments herein.

FIG. 5 is a flow chart of processing steps performed by the configuration process 150-2 to identify settings 195 in a configuration file 199 in accordance with one example embodiment.

In step 210, the configuration process 150-2 identifies a background color in configuration file 199 for rendering by the video editor application 153 in the browser 152.

In step 211, the configuration process 150-2 identifies a background pattern (e.g., hash lines, polka dots, and the like) in configuration file 199 for rendering by the video editor application 153 in the browser 152.

In step 212, the configuration process 150-2 identifies a background image (e.g., a JPEG image file) in configuration file 199 for rendering by the video editor application 153 in the browser 152.

In step 213, the configuration process 150-2 identifies a skin in configuration file 199 for rendering by the video editor application 153 in the browser, wherein the skin is indicative of a graphical user interface theme. Skins are generally known in the art as the outer layer or appearance of a graphical user interface having a specific theme or motif.

In step 214, the configuration process 150-2 renders, in the video editor application 153, at least one from the group of a background color, background pattern, background image, and/or skin in conjunction with the browser 152.

Figure 6:
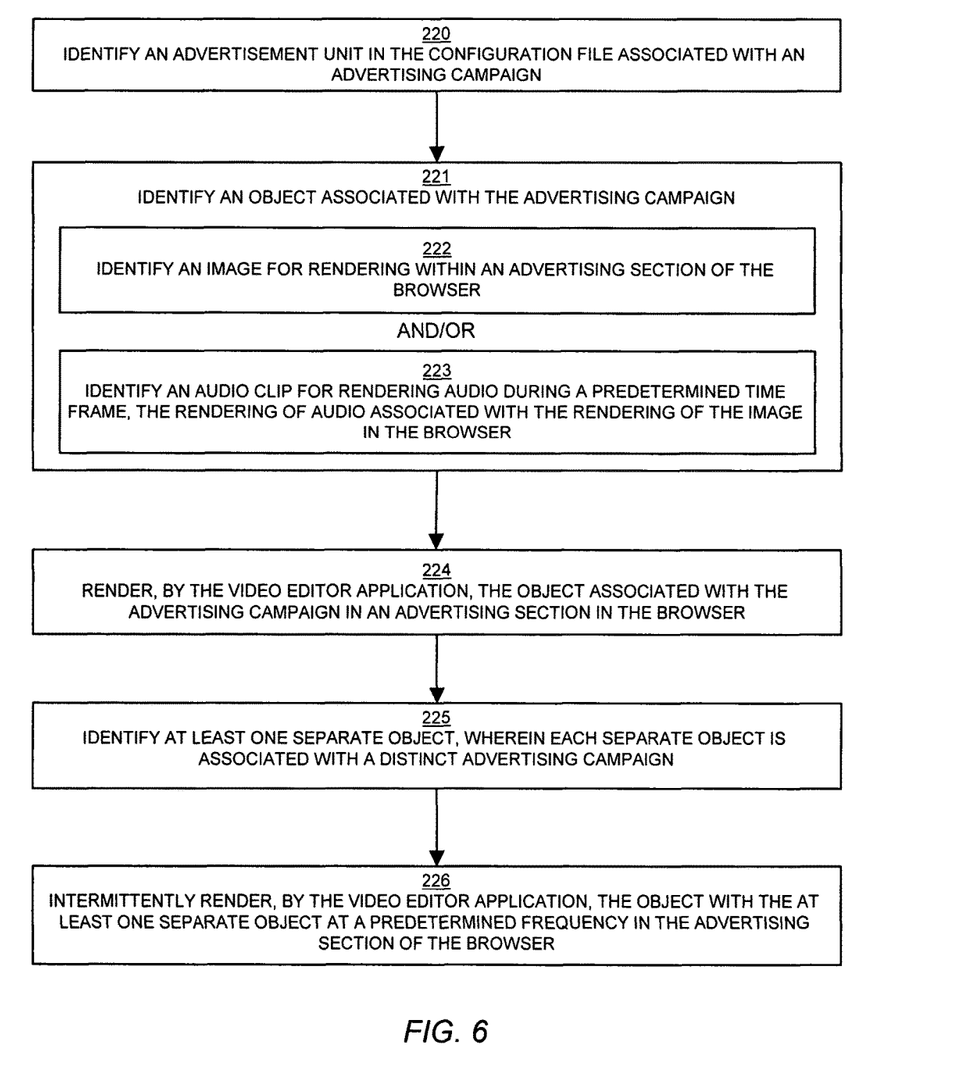
FIG. 6 is a flow chart of processing steps performed by a configuration process according to embodiments herein.

FIG. 6 is a flow chart of processing steps performed by the configuration process 150-2 to identify advertising settings of a video editor application 153 in accordance with one example embodiment.

In step 220, the configuration process 150-2 identifies an advertisement unit 171 (e.g., specific advertising information) in the configuration file 199 associated with an advertising campaign. For instance, in the example embodiment of FIG. 1 the video editor application 153 has an advertising section 170 (e.g., display region) dedicated specifically for the rendering of advertising units 171 (and the associated advertising campaigns). Although shown in the bottom right corner of the browser 152 in FIG. 1, the advertising section 170 can be located anywhere in the graphical user interface and can have any shape and/or size.

In step 221, the configuration process 150-2 identifies an object associated with the advertising campaign. The object can be any media file associated with a specific advertising campaign such as, but not limited to, an image file, a video file, an ActiveX control, a Java applet, a Flash file, etc. and similar content related to the presentation of rich media advertising.

In step 222, the configuration process 150-2 identifies an image (e.g., a JPEG image file, advertisement, etc.) for rendering within the advertising section 170 of browser 152.

In step 223, the configuration process 150-2 identifies an audio clip for rendering an audio signal associated with information (e.g., images) displayed in advertising section 170. As such, a sponsor or advertiser may produce an advertising campaign that includes the concurrent rendering of an audio clip and the image file in the advertising section 170. In one example embodiment, the audio clip may be rendered for a predetermined time (e.g., 30 seconds) and can be looped such that the audio clip replays (or is re-rendered) upon completion of each rendition.

In step 224, the configuration process 150-2 renders, in the video editor application 153, the object associated with the advertising campaign in the advertising section 170 of the browser 152.

In step 225, the configuration process 150-2 identifies at least one separate object (e.g., a Flash file, image and/or audio clip distinct form the image displayed in step 223). In this manner, each separate object is associated with a distinct advertising campaign. As shown in the example embodiment of FIG. 2, the "adunit" setting 195 comprises two fields 196 such that each field 196 represents a separate and distinct advertising unit 171.

In step 226, the configuration process 150-2 renders, in the video editor application 153, the object with the at least one separate object at a predetermined frequency in the advertising section 170 of the browser 152. For example, in one embodiment the configuration process 150-2 intermittently renders, video editor application 153, two advertising units 171 at a predetermined frequency (e.g., every 30 seconds) by switching between an image file associated with a first advertising campaign and a Flash file associated with a second advertising campaign. As shown in the example embodiment of FIG. 2, the "refresh" field 196 in the "adunit" setting 195 is configured to re-render or switch between the two advertising campaigns specified by the "ad path" fields 196 every 30 seconds.

Figure 7:
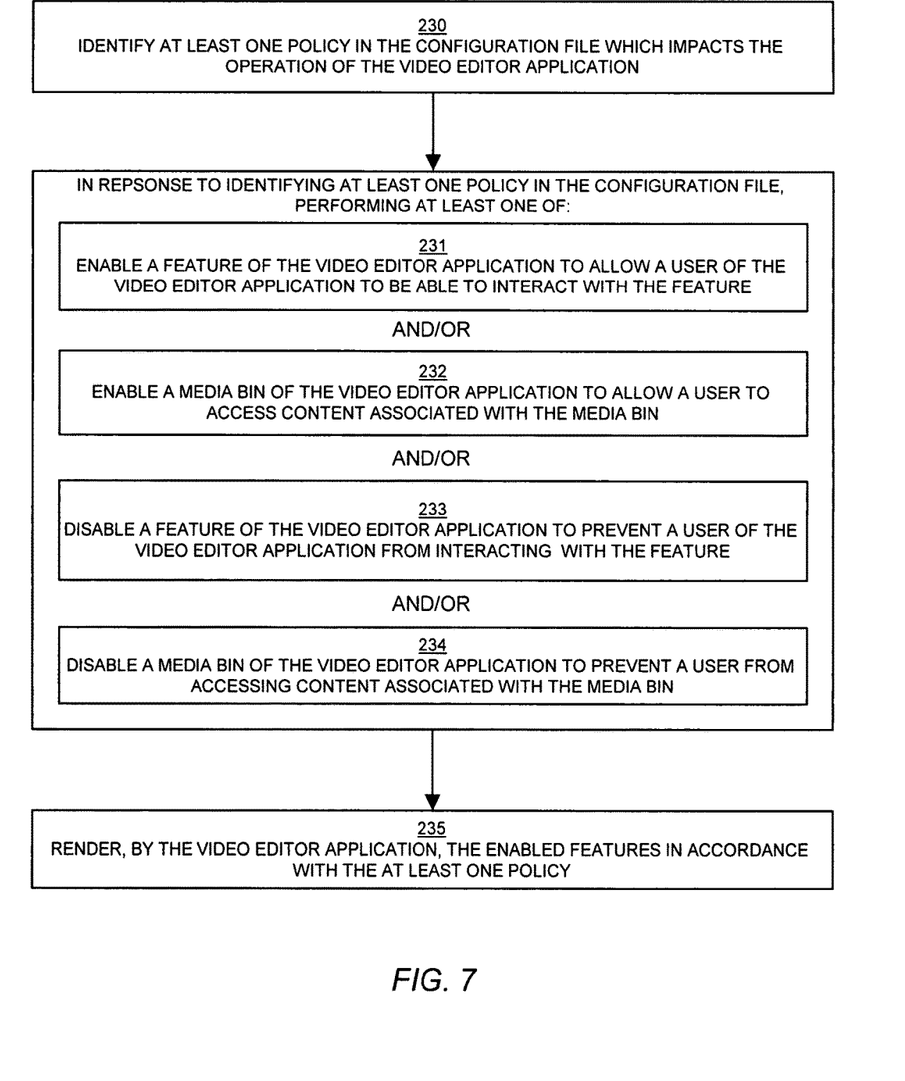
FIG. 7 is a flow chart of processing steps performed by a configuration process according to embodiments herein.

FIG. 7 is a flow chart of processing steps performed by the configuration process 150-2 when it identifies policy settings of a video editor application 153 in accordance with one example embodiment.

In step 230, the configuration process 150-2 identifies at least one policy which impacts the operation of the video editor application 153. Video editing policies affect, for example, the availability of various features of the video editor application 153, as well as the accessibility to various media (e.g., video files, images, etc.) that may be utilized by a user 108 of the video editor application 153. Typically, the policies are configured and administered by a programmer/administrator of a website that hosts the video editor application 153. In addition, the policies are typically tailored to a particular theme and/or advertising campaign.

In step 231, the configuration process 150-2 enables a feature of the video editor application 153 to allow a user of the video editor application 153 the ability to interact with the feature (e.g., Feature1 181, Feature2 181 and Publish feature 183). For example, in one embodiment the configuration process 150-2 enables the My Videos media bin 161, Effects media bin 165, and a Publish feature 183 in accordance with a policy.

In step 232, the configuration process 150-2 enables a media bin 161-165 of the video editor application 153 to allow a user 108 to access content (e.g., video clips in the My Videos media bin 161) associated with the media bin.

In step 233, the configuration process 150-2 disables a feature of the video editor application 153 to prevent a user of the video editor application 153 from interacting with the feature. As an example, in one embodiment the configuration process 150-2 disables the My Music media bin 163 (e.g., such that a user 108 cannot access the audio content contained in the My Music media bin 163) and the Publish feature 183 in accordance with a policy. In various embodiments, the configuration process 150-2 may disable a feature by rendering the feature (e.g., My Music media bin 163) and preventing access to the media bin, by rendering a modified version of the feature (e.g., "graying" or darkening the feature in the browser 152), or by not rendering the feature in the browser 152. The example embodiment of FIG. 1 shows the Publish feature 183 in an "X'd" out configuration to denote that this feature has been disabled by the configuration process 150-2.

In step 234, the configuration process 150-2 disables a media bin 161-165 of the video editing application 153 to prevent a user 108 from accessing content (e.g., music clips in the My Music media bin 163) associated with the media bin.

In step 235, the configuration process 150-2 renders, in the video editor application 153, the enabled features in accordance with at least one policy.

Figure 8:
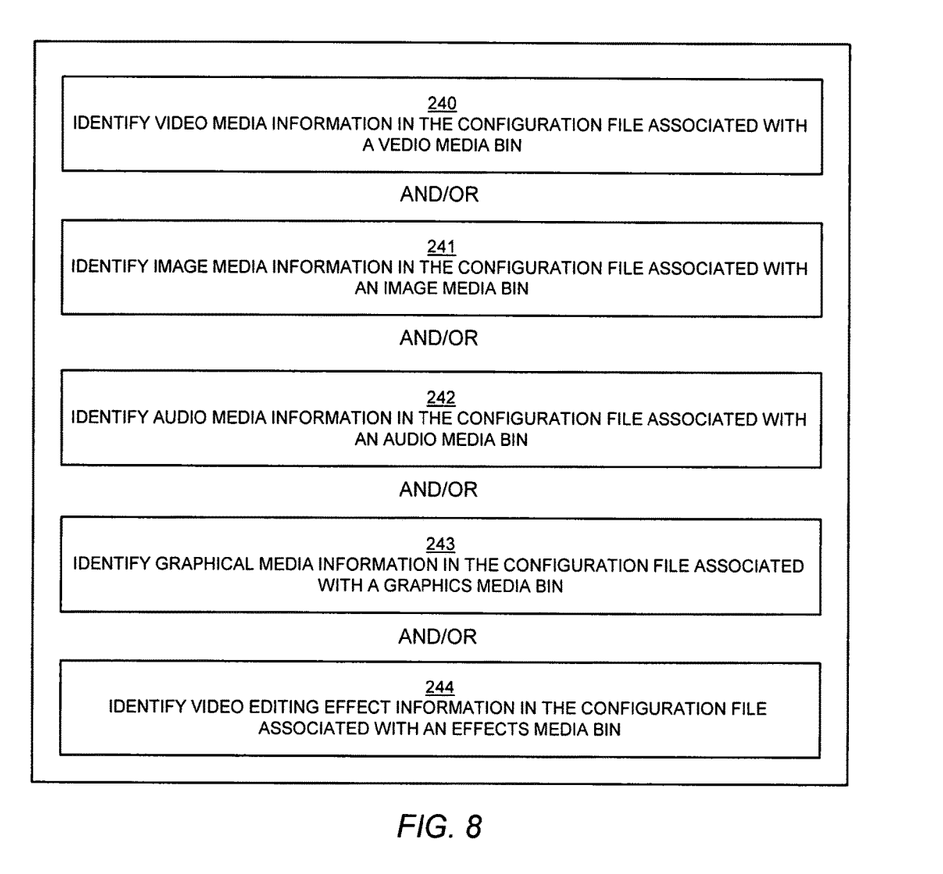
FIG. 8 is a flow chart of processing steps performed by a configuration process according to embodiments herein.

FIG. 8 is a flow chart of processing steps that shows processing operations performed by the configuration process 150-2 when it enumerates media bin settings of a video editor application 153 in accordance with one example embodiment.

In step 240, the configuration process 150-2 identifies video media information (e.g., video clips, video index file, etc.) associated with a video media bin (e.g., My Videos media bin 161). For instance, FIG. 1 depicts an example embodiment of the video editor application 153 rendering the My Videos media bin 161 that provides access to video clips Video1 166-1, Video2 166-2 and Video3 166-3. In another embodiment, as shown in FIG. 2, the configuration file 199 identifies the My Videos media bin 161 as a field 196 subordinate to the media bins setting 195. The My Videos field 196 includes a path or URL to a video index file (path="config/videos.xml") that contains file location information pertaining to each video file accessible by the My Videos media bin 161. In another embodiment, the My Videos field 196 may also include a direct path or URL to a video file instead of the video index file.

In step 241, the configuration process 150-2 identifies image media information associated with an image media bin (My Images media bin 162). For example, in one embodiment assume that the My Images field 196 in configuration file 199 includes a path or URL to an image index file (e.g., path="config/images.xml") that contains file location information pertaining to each image file (e.g., digital photographs) accessible by the My Images media bin 162. In another embodiment, the My Images field 196 may also include a direct path or URL to an image file instead of an image index file.

In step 242, the configuration process 150-2 identifies audio media information associated with an audio media bin (e.g., My Music media bin 163). For example, in one embodiment the My Music field 196 in configuration file 199 includes a path or URL to an audio index file (e.g., path="config/audio.xml") that contains file location information pertaining to each audio file (e.g., MP3 files) accessible by the My Music media bin 163. In another embodiment, the My Music field 196 may also include a direct path or URL to an audio file instead of the audio index file.

In step 243, the configuration process 150-2 identifies graphical media associated with a graphics media bin (e.g., My Graphics media bin 164). Typically, the graphics (e.g., captions) are predefined images, text strings, etc., that may be superimposed on a video clip when rendered by the video editor application 153.

In step 244, the configuration process 150-2 identifies at least one effect associated with an effects media bin (e.g., My Effects media bin 165). Generally, video editing effects may include, for example, rendering video in a black and white mode, various transition schemes for transitioning between video clips, and the like.

Figure 9:
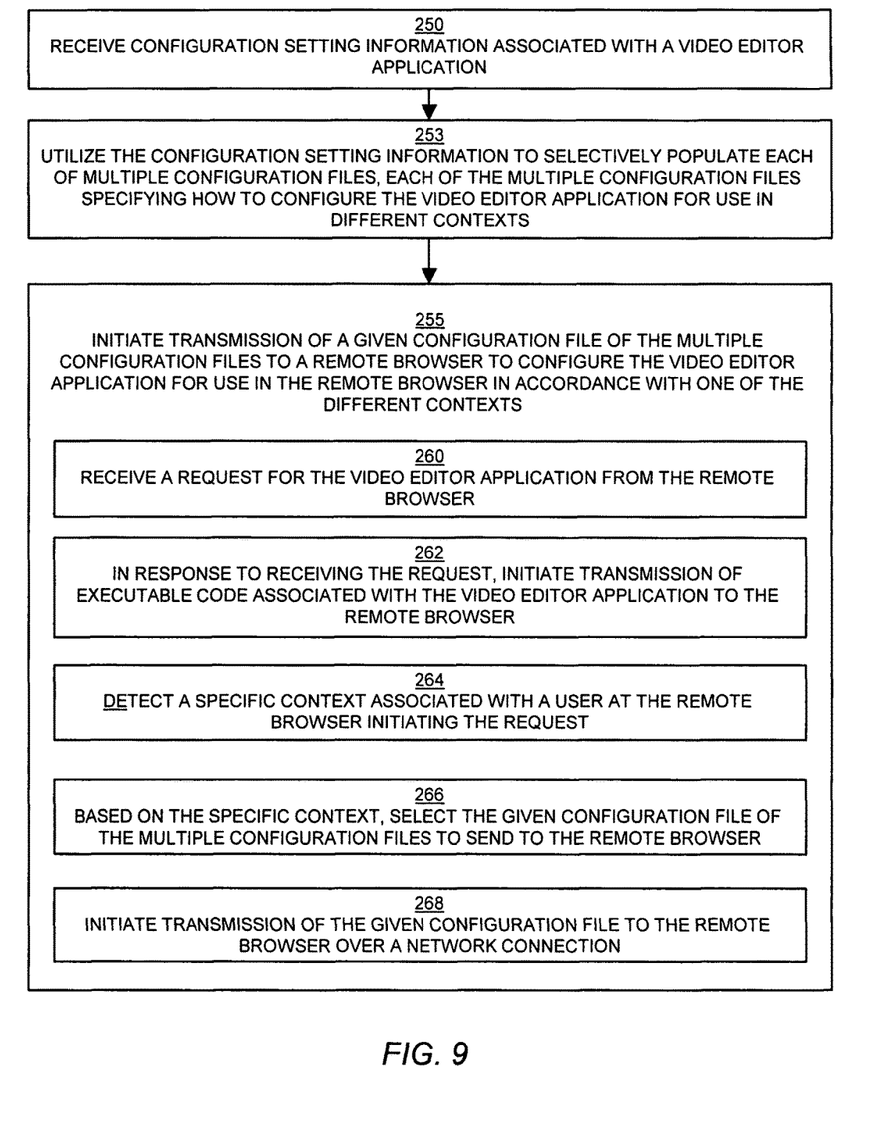
FIG. 9 is a flow chart of processing steps performed by a configuration process according to embodiments herein.

FIG. 9 is a flowchart illustrating creation, management, and distribution of configuration files according to embodiments herein.

In step 250, the server 147 (FIG. 3) receives configuration setting information associated with a video editor application 153. The configuration setting information can be received from a network administrator or other resource that creates and manages the different types of configuration files stored in server 147.

In step 253, the server 147 utilizes the configuration setting information to selectively populate each of multiple configuration files stored in a respective repository associated with server 147. As previously discussed, each of the multiple configuration files specifies how to configure the video editor application 153 for use in different contexts.

In step 255, the server 147 initiates transmission of a given configuration file (e.g., configuration file 199) of the multiple configuration files to a remote browser 152 to configure the video editor application 153 for use in the remote browser 152 in accordance with one of the different contexts (e.g., user identity, web usage, content selection, etc.) associated with the remote browser 152.

In step 260, the server 147 receives a request for transmission of the video editor application 153 (or corresponding executable code 148) for transmission to the remote browser. The request can be received in response to the user 108 at browser 152 visiting a particular website.

In step 262, in response to receiving the request, the server 147 initiates transmission of executable code 148 associated with the video editor application 153 to the remote browser 153.

In step 264, the server 147 detects a specific context associated with the user 108 at the remote browser 152 initiating the request. This can be achieved by receiving or utilizing specific information associated with the user 108 or browser 152 to identify a corresponding configuration file to send the user 108.

In step 266, based on the specific context (e.g., use of video editor application 153) detected in step 264, the server 147 selects the given configuration file 199 of the multiple configuration files to send to the remote browser 152.

In step 268, the server 147 initiates transmission of the given configuration file 199 to the remote browser 153 over the network 149.

Those skilled in the art should readily appreciate that the programs and methods for rendering a configuration application defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for rendering a video editor application has been particularly shown and described with

What we claim is:

1. A method comprising:
   in a browser on a computing device, obtaining a video editor application over a network, wherein the video editor application, when executed by the browser, displays a rendering area for displaying editable video content, a video editing workspace comprising one or more editing functions for editing the video content, and an advertising section for displaying one or more advertising objects related to one or more advertising campaigns;
   determining identity information identifying a user using the browser on the computing device;
   requesting a configuration file over the network specific to the identity information identifying the user using the browser on the computing device, the configuration file defining which of the one or more editing functions in the video editing workspace are to be enabled and further defining the one or more advertising objects that are to be displayed in the advertising section for an instance of the video editor application executing in conjunction with the browser; and
   executing the instance of the video editor application in conjunction with the browser on the computing device in accordance with the configuration file obtained over the network.

2. The method of claim 1, wherein the configuration file further defines one of a background color, a background pattern, a background image, or a skin indicative of a user interface theme, and wherein the method further comprises:
   rendering, by the video editor application, at least one from the group of a background color, background pattern, background image and skin in conjunction with the browser.

3. The method of claim 1 further comprising:
   identifying, from the configuration file, a first advertising object associated with a first advertising campaign and a second advertising object associated with a second advertising campaign,
   wherein executing the instance of the video editor application in conjunction with the browser in accordance with the configuration file obtained over the network comprises:
      intermittently rendering, in the advertising section of the video editor application, the first object associated with the first advertising campaign and the second object associated with the second advertising campaign at a predetermined frequency in an advertising display region of in the browser.

4. The method of claim 3, wherein identifying the first object associated with the first advertising campaign includes:
   identifying a first image for rendering within the advertising section of the video editor application; and
   identifying a first audio clip for producing a corresponding audio signal associated with the first image,
   and wherein identifying the second object associated with the second advertising campaign includes:
      identifying a second image for rendering within the advertising section of the video editor application; and
      identifying a second audio clip for producing a corresponding second audio signal associated with the second image, wherein the first image and the first audio clip are different from the second image and the second audio clip.

5. The method of claim 1 further comprising:
   identifying an advertising campaign from the configuration file;
   identifying a policy in the configuration file that defines which of the one or more editing functions in the video editing workspace are to be enabled, wherein the identified policy is specific to the identified advertising campaign; and
   in response to identifying the policy in the configuration file:
      a) enabling a first editing function of the one or more editing functions of the video editor application to allow the user of the video editor application to be able to interact with the first function; and
      b) disabling a second editing function of the one or more editing functions of the video editor application to prevent the user of the video editor application from interacting with the second function; and
   wherein executing the instance of the video editor application in conjunction with the browser in accordance with the configuration file obtained over the network comprises:
      rendering, by the video editor application, the first function in the video editing workspace in accordance with the identified policy.

6. The method of claim 5,
   wherein enabling a first function comprises enabling a first media bin of the video editor application to allow a user to access content associated with the first media bin, the first media bin providing access to a first set of audio or video content; and
   wherein disabling a second function comprises disabling a media bin of the video editor application to prevent a user from accessing content associated with the second media bin, the second media bin providing access to a second set of audio or video content.

7. The method of claim 1 further comprising:
   identifying video media information in the configuration file associated with a video media bin;
   identifying image media information associated with an image media bin;
   identifying audio media information in the configuration file associated with an audio media bin;
   identifying graphical media information in the configuration file associated with a graphics media bin; and
   identifying video editing effect information in the configuration file associated with an effects media bin.

8. The method of claim 1, wherein obtaining the configuration file over the network occurs in response to generation of a request by the video editor application initiating the request from the browser to a remote server for retrieval of the configuration file over the network.

9. A method comprising:
   receiving configuration setting information associated with a video editor application, wherein the video editor application, when executed by the browser, displays a rendering area for displaying editable video content, a video editing workspace comprising one or more editing functions for editing the video content, and an advertising section for displaying one or more advertising objects related to one or more advertising campaigns;
   utilizing the configuration setting information to selectively populate each of multiple configuration files, each of the multiple configuration files specifying which of the one or more editing functions in the video editing workspace are to be enabled and further defining the one or more advertising objects that are to be displayed in the advertising section, wherein each of the multiple configuration files are specific to a different user using a remote browser on a computing device;

receiving a request for the video editor application from the remote browser;

in response to receiving the request, initiating transmission of executable code associated with the video editor application to the remote browser;

detecting identity information identifying the user using the remote browser on the computing device;

based on the identity information of the user, selecting the given configuration file of the multiple configuration files to send to the remote browser; and initiating transmission of a given configuration file of the multiple configuration files to the remote browser on the computing device to configure the video editor application for use in the remote browser on the computing device, wherein initiating transmission of the configuration file includes providing the given configuration file to the remote browser on the computing device over a network connection.

10. A method as in claim 9 further comprising:

detecting selected video content to be edited by the video editor application initiating the request; and wherein initiating transmission of the given configuration file includes providing the given configuration file associated with a class of video content that includes the content to be edited by the video editor application.

11. A computerized device comprising:

a memory;

a processor;

a communications interface;

an interconnection mechanism coupling the memory, the processor and the communications interface; and wherein the memory is encoded with a browser application that when executed on the processor provides a video editing process causing the computerized device to be capable of performing the operations of:

in a browser, obtaining a video editor application over a network, wherein the video editor application, when executed by the browser application, displays a rendering area for displaying editable video content, a video editing workspace comprising one or more editing functions for editing the video content, and an advertising section for displaying one or more advertising objects related to one or more advertising campaigns;

determining identity information specific to a user of the browser;

requesting a configuration file over the network specific to the identity information, the configuration file defining which of the one or more editing functions in the video editing workspace are to be enabled and further defining the one or more advertising objects that are to be displayed in the advertising section for an instance of the video editor application executing in conjunction with the browser; and executing the instance of the video editor application in conjunction with the browser on the computing device in accordance with the configuration file obtained over the network.

12. A computer program product having a computer readable medium operable to store computer program logic embodied in computer program code encoded thereon as an encoded set of processor based instructions for performing video editing comprising:

computer program code for in a browser on a computing device, obtaining a video editor application over a network, wherein the video editor application, when executed by the browser, displays a rendering area for displaying editable video content, a video editing workspace comprising one or more editing functions for editing the video content, and an advertising section for displaying one or more advertising objects related to one or more advertising campaigns;

computer program code for determining identity information identifying a user using the browser on the computing device;

computer program code for requesting a configuration file over the network specific to the identity information identifying the user using the browser on the computing device, the configuration file defining which of the one or more editing functions in the video editing workspace are to be enabled and further defining the one or more advertising objects that are to be displayed in the advertising section for an instance of the video editor application executing in conjunction with the browser and;

computer program code for executing the instance of the video editor application in conjunction with the browser on the computing device in accordance with the configuration file obtained over the network.

\* \* \* \* \*